United States Patent
Lacerda et al.

(10) Patent No.: US 10,346,441 B2
(45) Date of Patent: Jul. 9, 2019

(54) SYSTEMS AND METHODS FOR PROVIDING PREDICTIONS TO APPLICATIONS EXECUTING ON A COMPUTING DEVICE

(71) Applicant: Apple Inc., Cupertino, CA (US)

(72) Inventors: Joao Pedro Lacerda, Los Gatos, CA (US); Gaurav Kapoor, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 722 days.

(21) Appl. No.: 14/866,786

(22) Filed: Sep. 25, 2015

(65) Prior Publication Data

US 2016/0358078 A1  Dec. 8, 2016

Related U.S. Application Data

(60) Provisional application No. 62/172,029, filed on Jun. 5, 2015.

(51) Int. Cl.
*G06F 16/28* (2019.01)
*G06N 20/00* (2019.01)
*G06F 16/903* (2019.01)

(52) U.S. Cl.
CPC ...... *G06F 16/285* (2019.01); *G06F 16/90335* (2019.01); *G06N 20/00* (2019.01)

(58) Field of Classification Search
CPC ...... G06N 5/0427; G06N 5/043; G06N 5/022; G06N 99/005; G06N 7/00; G06F 17/30598; G06F 17/30979; G06F 9/542; G06F 9/52; G06F 15/18; G06F 17/3053
See application file for complete search history.

(56) References Cited

U.S. PATENT DOCUMENTS

| | | | | |
|---|---|---|---|---|
| 6,289,329 B1* | 9/2001 | Sethi | ............ | G06N 3/0427 706/15 |
| 6,738,811 B1* | 5/2004 | Liang | ............ | H04L 41/147 709/224 |
| 9,195,508 B1* | 11/2015 | Blanding | ............ | G06F 9/5027 |
| 9,767,417 B1* | 9/2017 | Hoover | ............ | G06N 7/02 |
| 2005/0108322 A1* | 5/2005 | Kline | ............ | G06F 17/30902 709/203 |

(Continued)

*Primary Examiner* — Eric Nilsson
*Assistant Examiner* — Brent Johnston Hoover
(74) *Attorney, Agent, or Firm* — Dickinson Wright RLLP

(57) ABSTRACT

The embodiments set forth techniques for implementing various "prediction engines" that can be configured to provide different kinds of predictions within a mobile computing device. According to some embodiments, each prediction engine can assign itself as an "expert" on one or more "prediction categories" within the mobile computing device. When a software application issues a request for a prediction for a particular category, and two or more prediction engines respond with their respective prediction(s), a "prediction center" can be configured to receive and process the predictions prior to responding to the request. Processing the predictions can involve removing duplicate information that exists across the predictions, sorting the predictions in accordance with confidence levels advertised by the prediction engines, and the like. In this manner, the prediction center can distill multiple predictions down into an optimized prediction and provide the optimized prediction to the software application.

20 Claims, 11 Drawing Sheets

(56) References Cited

U.S. PATENT DOCUMENTS

| | | | |
|---|---|---|---|
| 2009/0076988 A1* | 3/2009 | Stanelle | G06N 7/005 706/12 |
| 2011/0106736 A1* | 5/2011 | Aharonson | G06Q 10/109 706/12 |
| 2012/0095977 A1* | 4/2012 | Levin | G06F 17/30867 707/706 |
| 2013/0117208 A1* | 5/2013 | Dousse | G06Q 30/0202 706/21 |
| 2015/0074033 A1* | 3/2015 | Shah | G06N 5/02 706/46 |
| 2016/0019460 A1* | 1/2016 | Li | G06F 9/542 719/318 |
| 2016/0125312 A1* | 5/2016 | Hines | G06Q 10/103 706/12 |

* cited by examiner

SYSTEMS AND METHODS FOR PROVIDING PREDICTIONS TO APPLICATIONS EXECUTING ON A COMPUTING DEVICE

CROSS-REFERENCE TO RELATED APPLICATIONS

The present application claims the benefit of U.S. Provisional Application No. 62/172,029, entitled "SYSTEMS AND METHODS FOR PROVIDING PREDICTIONS TO APPLICATIONS EXECUTING ON A COMPUTING DEVICE," filed Jun. 5, 2015, the content of which is incorporated herein by reference in its entirety for all purposes.

FIELD

The described embodiments set forth a technique for providing predictions to applications executing on a computing device in order to improve overall user experience and performance of the computing device.

BACKGROUND

Recent years have shown a widespread consumer adoption of mobile computing devices (e.g., smartphones and tablets). A noticeable difference between mobile computing devices and traditional computing devices (e.g., desktop computers) is that mobile computing devices tend to be consistently used throughout the day to perform a variety of functions that are highly personalized to their users. Such functions can include, for example, sending and receiving messages (e.g., emails, chats, etc.), browsing the web, listening to music, taking photos, and so on. Notably, a user's interaction with his or her mobile computing device can, at least in some areas, conform to a strong and reliable pattern of behavior. For example, a user can typically access a different subset of applications at different times throughout the day, communicate with a different subset of individuals at different times throughout the day, and the like.

In some cases, these behavioral patterns can establish opportunities to enhance both the user's experience and the overall performance of the mobile computing device. For example, if a user's pattern of behavior indicates that he or she contacts the same individual at around the same time each day, e.g., when leaving his or her place of work in, it can be desirable for the mobile computing device to promote the individual within a user interface (UI) of a phone application that the user accesses to place phone calls using his or her mobile computing device. For understandable reasons, this functionality can substantially improve the user's overall satisfaction with his or her mobile computing device, especially when various software applications that are accessed by the user are configured to provide meaningful suggestions that properly anticipate the user's behavior and reduce the amount of input that the user is required to provide to access the functionality that he or she is seeking.

Notably, conventional techniques for attempting to predict a user's behavior continue to suffer from various issues that can degrade the user's experience and even degrade the performance of the user's mobile computing device. More specifically, conventional techniques tend to gather and analyze behavioral data in a disorganized manner, thereby making it difficult to provide meaningful and accurate predictions that can be used to enhance the user's experience. For example, inaccurately predicting a user's behavior can cause a mobile computing device to make suggestions to the user that are inaccurate and cumbersome to dismiss. Moreover, conventional techniques often are implemented at layers within an operating system (OS) of the mobile computing device that are difficult to update and that are largely inaccessible to software developers. Consequently, software developers are prevented from experimenting with and providing enhanced prediction techniques that can potentially improve overall accuracy and performance when generating predictions at a mobile computing device.

Accordingly, there exists a need for improved methods for gathering and organizing behavioral data in a manner that enables mobile computing devices to provide meaningful predictions to their end users.

SUMMARY

The embodiments described herein set forth techniques for implementing various "prediction engines" that can be configured to provide different kinds of predictions within a mobile computing device. According to some embodiments, each prediction engine can assign itself as an "expert" on one or more "prediction categories" within the mobile computing device. When a software application issues a request for a prediction for a particular prediction category, and two or more prediction engines respectively respond with predictions, a "prediction center" can be configured to receive and process the predictions prior to responding to the request. Processing the predictions can involve removing duplicate information that exists across the predictions, sorting the predictions in accordance with confidence levels advertised by the prediction engines, and the like. In this manner, the prediction center can distill multiple predictions down into an optimized prediction and provide the optimized prediction to the software application.

One embodiment sets forth a method for synchronously providing a prediction to a software application executing on a mobile computing device. Specifically, the method is implemented at a prediction center executing on the mobile computing device, and includes the steps of (1) receiving, from the software application, a request to synchronously provide a prediction for a prediction category, (2) identifying one or more prediction engines that are associated with the prediction category, (3) receiving one or more predictions produced by the one or more prediction engines in accordance with the request, (4) aggregating the one or more predictions to produce the prediction requested by the software application, and (5) providing the prediction to the software application.

Another embodiment sets forth a method for asynchronously providing a prediction to a software application executing on a mobile computing device. Specifically, the method is implemented at a prediction center executing on the mobile computing device, and includes the steps of (1) receiving, from the software application, a request to asynchronously provide a prediction for a prediction category, (2) identifying one or more prediction engines that are associated with the prediction category, and (3) notifying each prediction engine of the one or more prediction engines to asynchronously provide one or more predictions in accordance with the request.

Yet another embodiment sets forth a mobile computing device configured to generate predictions in accordance with user behavior. Specifically, the mobile computing device is configured to implement (1) a prediction center configured serve as a mediator between one or more prediction engines and one or more software applications, wherein the prediction center manages a plurality of prediction categories, (2) the one or more prediction engines, wherein each prediction engine of the one or more prediction engines serves as an expert on at least one prediction category of the plurality of prediction categories managed by the prediction center, and (3) the one or more software applications, wherein each software application of the one or more software applications is configured to carry out steps that include (i) issuing, to the prediction center, a request for a prediction for a particular prediction category of the plurality of prediction categories, and (ii) receiving the prediction from the prediction center in accordance with the request, wherein the prediction is an aggregation of at least two predictions produced by the prediction engines that serve as an expert on the particular prediction category.

Other embodiments include a non-transitory computer readable medium configured to store instructions that, when executed by a processor, cause the processor to implement any of the foregoing techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
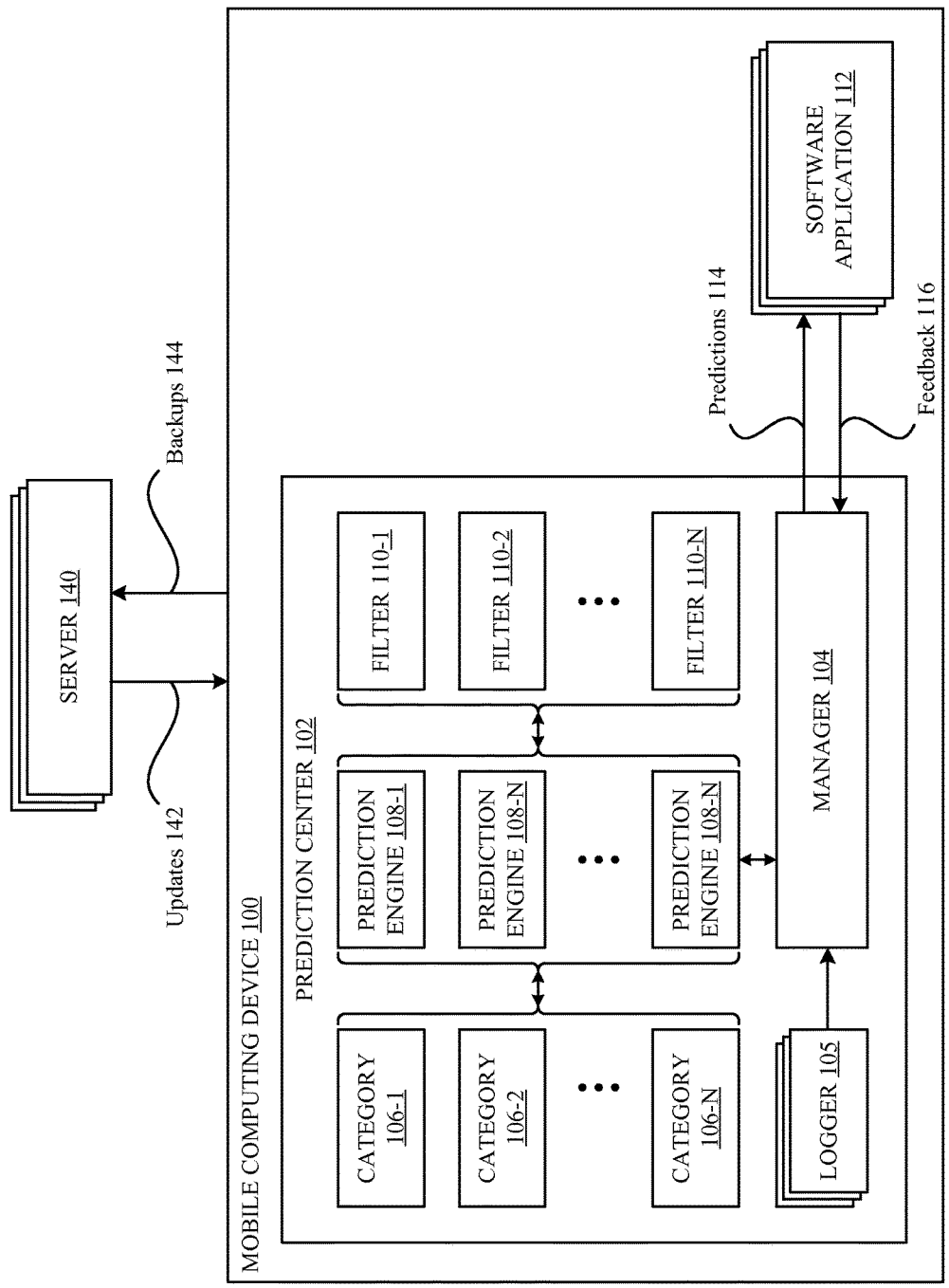
FIG. 1 illustrates a block diagram of different components of a mobile computing device configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for gathering and organizing behavioral data in a manner that enables a mobile computing device to provide meaningful predictions to its end user. According to some embodiments, the mobile computing device can be configured to implement various "prediction engines" that each can be configured to provide different kinds of predictions within the mobile computing device. More specifically, and according to some embodiments, each prediction engine can assign itself as an "expert" on one or more "prediction categories" that can be used to enhance the overall operation of the mobile computing device. Examples of prediction categories can include software applications (e.g., software application usage, activations/deactivations), people (e.g., callers or recipients phone calls, chats, text messages, etc.), geodata (e.g., mobile computing device movement/locales), notifications (e.g., push notification arrivals), physical input (e.g., attaching headphones/power to the mobile computing device), and the like. It is noted that the foregoing prediction categories are merely exemplary and that the embodiments set forth herein can employ any prediction category that the mobile computing device is capable of maintaining. According to some embodiments, a prediction engine can employ learning models that enable the prediction engine to analyze data (e.g., behavioral data associated with a user's operation of the mobile computing device) and provide predictions in accordance with the data. Although this disclosure primarily discusses prediction engines that are configured to implement learning models, it is noted that any technique for analyzing behavioral data and providing predictions can be employed by the prediction engines described herein.

As previously set forth herein, and according to some embodiments, a prediction engine can assign itself as an expert on one or more prediction categories within the mobile computing device. Consequently, in some cases, two or more prediction engines may assign themselves as experts for the same prediction category within the mobile computing device. Accordingly, when a requesting entity—such as a software application—issues a request for a prediction for a prediction category on which two or more prediction engines have assigned themselves as an expert, each prediction engine of the two or more prediction engines will conduct its own analysis (e.g., in accordance with learning models employed by the prediction engine) and generate a prediction (or more) in accordance with the request. In this scenario, at least two or more predictions are generated in response to the request for the prediction, which can establish redundancies and competing predictions that the software application may not be capable of interpreting.

Accordingly, the embodiments also set forth a "prediction center" that is configured to serve as a mediator between prediction engines and software applications. According to some embodiments, the prediction center can be configured to serve as a registrar for prediction engines when they initialize and seek to assign themselves as experts for one or more prediction categories. Similarly, and according to some embodiments, the prediction center can also be configured to manage different types of prediction categories within the mobile computing device, such that software applications can query the prediction center to identify categories of predictions that can be provided. In this manner, when a software application issues a request for a prediction for a particular prediction category, and two or more prediction engines respond with their respective prediction(s), the prediction center can be configured to receive and process the predictions prior to responding to the request issued by the software application. Processing the predictions can involve, for example, removing duplicate information that exists across the predictions, applying weights to the predictions in accordance with historical performance (i.e., accuracy) metrics associated with the prediction engines, sorting the predictions in accordance with confidence levels advertised by the prediction engines when generating their predictions, and the like. In this manner, the prediction center can distill multiple predictions down into an optimized prediction and provide the optimized prediction to the software application. Accordingly, this design beneficially simplifies the operating requirements of the software applications (as they do not need to be capable of processing multiple predictions), consolidates the heavy lifting to the prediction center, and enables the software applications to obtain a prediction that represents the input of various prediction engines that have assigned themselves as experts on the prediction category of interest.

According to some embodiments, the prediction center can enable a software application to receive predictions in a "synchronous" manner. More specifically, a software application can be configured to issue, to the prediction center, a request that causes the prediction center to interact with one or more prediction engines and provide a somewhat immediate (i.e., synchronous) response/prediction to the software application. This synchronous configuration can be used, for example, when a software application—such as a chat application—is being launched and is seeking to preemptively identify a contact with whom a user of the mobile computing device is most likely to message (e.g., in accordance with a current time of the day). According to other embodiments, the prediction center can enable a software application to receive predictions in an "asynchronous" manner. More specifically, a software application can be configured to issue, to the prediction center, a request that causes the prediction center to notify/configure one or more prediction engines to provide predictions on an as-needed (i.e., asynchronous/triggered) basis. This asynchronous configuration can be used, for example, when a software application—such as an OS kernel configured to activate (i.e., launch) and deactivate (i.e., close) software applications on the mobile computing device—is seeking to reactively load a software application in response to a physical input occurring at the mobile computing device. For example, a prediction engine can determine that a particular music application is manually launched by a user a majority of the time that headphones are plugged into his or her mobile computing device. In turn, the prediction engine can indicate this particular music application to the OS kernel via a prediction when the headphones are connected to the mobile computing device. In turn, the OS kernel can preemptively load the appropriate music application (in accordance with the prediction), which can help improve the user's experience and enhance the performance of the mobile computing device.

Accordingly, the different techniques set forth above enable software applications to interact with the prediction center to receive predictions that potentially can be used to enhance overall user experience. In some cases, it can be valuable for a software application to provide feedback to the prediction center to indicate whether a prediction produced by a prediction engine was accurate. Such feedback can be beneficial, for example, when learning algorithms are implemented by the prediction engines, as the feedback can be used to "train" the learning algorithms and improve the overall accuracy of their predictions. For example, when a prediction engine generates a prediction that a particular action will be taken by a user, and a software application provides feedback that indicates the prediction held true (i.e., the particular action was taken by the user), the prediction engine can increase the confidence level that is advertised when similar and subsequent predictions are produced by the prediction engine. As the confidence level rises, the predictions produced by the prediction engine can take precedence over competing predictions that are produced by other prediction engines (if any). Alternatively, when a prediction engine predicts that the particular action will be taken by the user, and the software application provides feedback that indicates the prediction did not hold true (i.e., another action was taken by the user), the prediction engine can decrease the confidence level that is advertised when similar and subsequent predictions are produced by the prediction engine. As the confidence level falls, the predictions produced by the prediction engine can be outweighed by competing predictions that are produced by the other prediction engines (if any).

Additionally, and according to some embodiments, the prediction center/prediction engines can be configured to implement loggers that maintain records of the generated predictions and their corresponding feedback. These records can be beneficial in a variety of manners, e.g., a developer of a prediction engine can receive records from a large number of mobile computing devices, where the records indicate that the prediction engine is continuously generating inaccurate predictions. In turn, the developer of the prediction engine can revisit the configuration of the prediction engine in order to improve its accuracy. Prediction centers across different mobile computing devices can also be configured to exchange information with one another in order to identify high-level trends that are observed and that can be used to enhance overall user experience. For example, prediction centers can identify between one another that when a majority of mobile computing devices enter into a particular geographical area—e.g., a perimeter of a movie theatre—the users of the mobile computing devices manually place their mobile computing devices into a silent mode. In turn, this identification can be used to provide suggestions to users to place their mobile computing devices into the silent mode when entering within the particular geographical area. This identification also can be used to suggest that an automatic rule be set in place where the mobile computing device automatically enters into the silent mode when the mobile computing device enters into the particular geographical area, thereby eliminating the need for the user to have to access his or her mobile computing device and manually place the mobile computing device into the silent mode.

In addition to the foregoing techniques, the prediction center can also be configured to implement one or more "filters" that can be utilized to further enhance the manner in which predictions are generated within the mobile computing device. According to some embodiments, the filters can be used to provide additional layers of processing that help reduce or eliminate the occurrence of predictions that, despite being correct and reliable (within the scope of the prediction engines), are in fact impractical and ineffective in real-world scenarios. Consider, for example, a scenario in which a lock screen application on a mobile computing device represents a software application, where the lock screen application displays a static icon for a camera application and a dynamic icon for a software application that is most likely to be accessed by the user (e.g., based on a current time of the day). In this example, the lock screen application can issue, to the prediction center, a request for a prediction associated with the "software applications" prediction category when seeking to identify a software application that should be associated with the dynamic icon displayed within the lock screen application. Consider further that, in this example, a single prediction engine is associated with the "software applications" prediction category, where the single prediction engine determines that the camera application is most likely to be accessed by the user (as it so often is when the lock screen application is displayed). Notably, in this example, this prediction is somewhat meaningless, as it would be wasteful to display two different icons for the same camera application within the lock screen application. Accordingly, a filter can be used to help prevent these scenarios from occurring, e.g., the filter can be configured to remove the camera application from predictions associated with the "software applications" prediction category any time the lock screen application is active on the mobile computing device.

Additionally, the prediction center/prediction engines can also be configured to implement one or more caches that can be used to reduce the amount of processing that takes place when generating predictions. According to some embodiments, a prediction, upon generation, can be accompanied by "validity parameters" that indicate when the prediction should be removed from the cache in which the prediction is stored. The validity parameters—also referred to herein as expiration information—can define, for example, time-based expirations, event-based expirations, and the like. In this manner, when a prediction engine frequently receives requests for a prediction for a particular prediction category, the prediction engine can generate and cache the prediction in order to substantially reduce the amount of future processing that would otherwise occur when processing repeated requests for the prediction. It is noted that the prediction center/prediction engines can be configured to cache predictions using a variety of approaches. For example, when available cache memory is limited, the prediction center/prediction engines can be configured to generate predictions a threshold number of times (e.g., within a time window), and, when the threshold is satisfied, transition to caching the prediction and referencing the cache for subsequent requests for the prediction (so long as the expiration information indicates the prediction is valid).

In addition, it is noted that the architecture of the prediction center can be configured in a manner that enables the different entities described herein—including prediction engines, prediction categories, filters, loggers, etc.—to function as modular components within the mobile computing device. In one architectural approach, each entity can be configured to implement a set of Application Programming Interface (API) function calls that enable the entity to communicate with the prediction center and provide the different functionalities described herein. According to this architectural approach, for example, an entity can be configured as a self-contained executable that can operate externally to the prediction center and be capable of providing the various functionalities described herein. In another architectural approach, each entity can be configured as a bundle whose format and contents are understood by the prediction center and enable the prediction center to function as a platform for implementing the functionality of the entity. According to this approach, the prediction center can be configured to, for example, parse different file system paths (e.g., when initializing) to identify different bundles that reside within the mobile computing device. In this manner, the bundles can be conveniently added to, updated within, and removed from the file system of the mobile computing device, thereby promoting a modular configuration that can efficiently evolve over time without requiring substantial updates (e.g., operating system upgrades) to the mobile computing device. It is noted that the foregoing architectures are exemplary, and that any architecture can be used that enables the various entities described herein to communicate with one another and provide their different functionalities.

Accordingly, the embodiments set forth techniques for gathering and organizing behavioral data in a manner that enables a mobile computing device to provide meaningful predictions to its end user. A more detailed discussion of these techniques is set forth below and described in conjunction with FIGS. 1, 2, 3A-3C, 4A-4B, 5A-5C, and 6, which illustrate detailed diagrams of systems and methods that can be used to implement these techniques.

FIG. 1 illustrates a block diagram of different components of a mobile computing device 100 that is configured to implement the various techniques described herein, according to some embodiments. More specifically, FIG. 1 illustrates a high-level overview of the mobile computing device 100, which, as shown, is configured to implement a prediction center 102 and various software applications 112. According to some embodiments, the prediction center 102 and the various software applications 112 can be implemented within an operation system (OS) (not illustrated in FIG. 1) that is configured to execute on the mobile computing device 100. As also shown in FIG. 1, the prediction center 102 can be configured to manage various loggers 105, various prediction categories 106, various prediction engines 108, and various filters 110. The prediction center 102 can also implement a manager 104 that is configured to serve as a mediator between the prediction engines 108 and the software applications 112, e.g., the manager 104 can receive predictions (illustrated in FIG. 1 as predictions 114) generated by the prediction engines 108 and forward the predictions 114 to the software applications 112. The prediction center 102 can also be configured to receive feedback information 116 from software applications 112 and provide the feedback information 116 to the prediction engines 108 so that they can produce more accurate predictions 114 over time.

Additionally, and as shown in FIG. 1, the mobile computing device 100 can be configured to communicate with one or more servers 140 in order to increase the flexibility and benefits provided by the various techniques described herein. More specifically, the mobile computing device 100 can be configured to receive and process updates 142 (e.g., over the air (OTA) updates) from the server 140, where each update 142 can be directed toward managing one or more aspects of the prediction center 102 (e.g., installations, updates, and removals of one or more categories 106, prediction engines 108, filters 110, loggers 105, etc.). For example, an update 142 can include high-level parameters that apply to standard prediction engines 108 that are employed by various mobile computing devices 100. The servers 140 can provide such an update 142, for example, in response to analyzing information provided by loggers 105—which can also provide information the servers 140—across a large number of mobile computing devices 100, and determining that one or more aspects of the prediction center 102 can be updated to improve accuracy and or performance. Accordingly, the updates 142 enable the mobile computing device 100 to beneficially receive and implement new functionalities that are established over time, which can improve the user's overall experience.

As also shown in FIG. 1, the mobile computing device 100 can be configured to provide backups 144 to the servers 140. According to some embodiments, a backup 144 can include information associated with one or more of the categories 106, the prediction engines 108 (and their associated state), the filters 110, the loggers 105, and the like, where the backup 144 is securely stored and associated with a user account that is known to the servers 140. In this manner, the valuable information that is gathered over time and enables the prediction engines 108 to accurately predict the user's behavior can remain securely backed up. This can be especially beneficial when a user migrates to a newer mobile computing device 100 or acquires a replacement mobile computing device 100, as the user does not have to start from scratch and retrain the various prediction engines 108 by way of inaccurate predictions 114 and feedback information 116.

Figure 2:
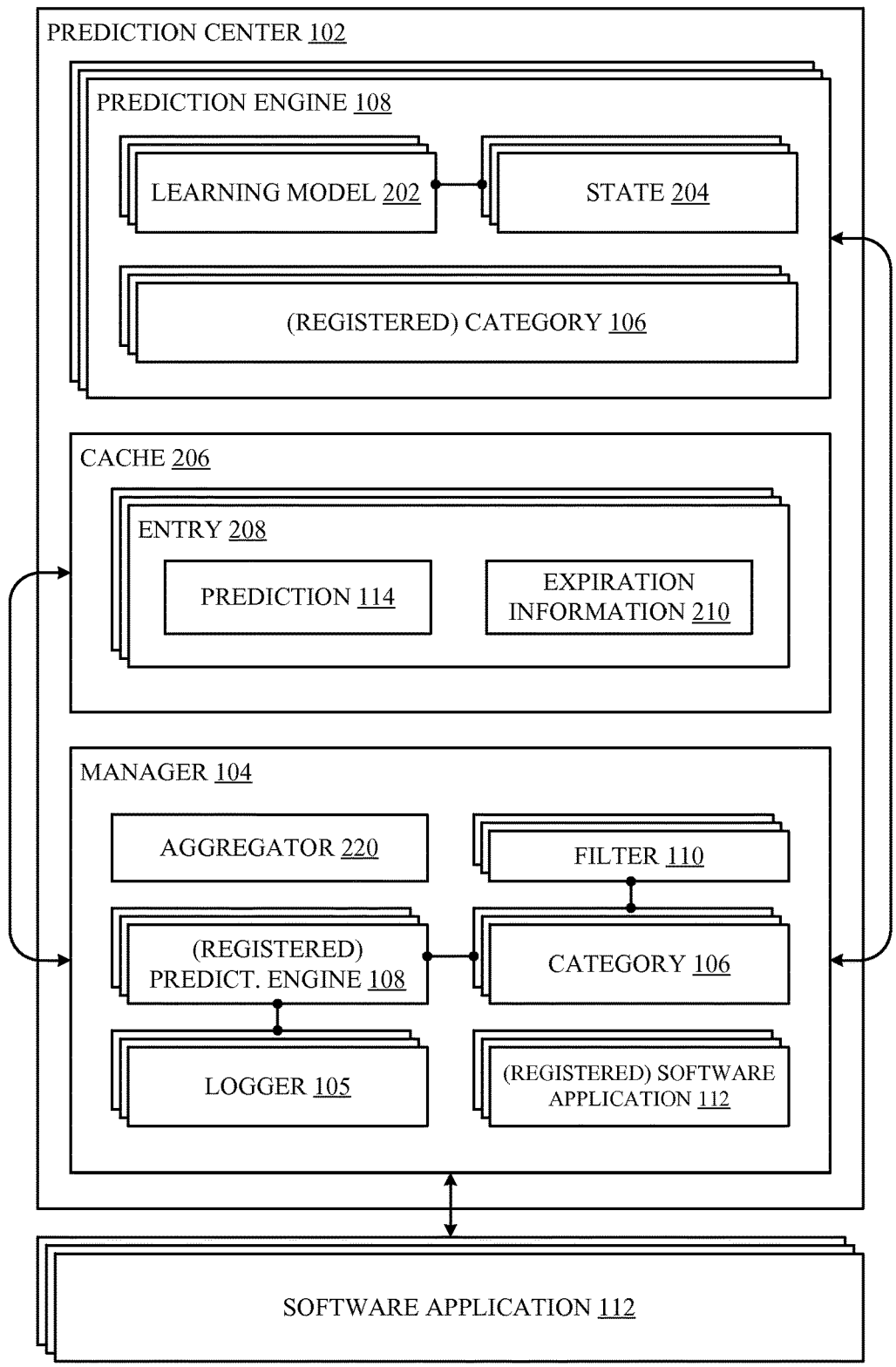
FIG. 2 illustrates a block diagram of a more detailed view of particular components of the mobile computing device illustrated in FIG. 1, according to one embodiment.

Accordingly, FIG. 1 provides a high-level overview of various components that can be used to implement the techniques set forth herein. FIG. 2 illustrates a block diagram of a more detailed view 200 of particular components of the mobile computing device 100 of FIG. 1, according to one embodiment. As shown in FIG. 2, each prediction engine 108 can be configured to include one or more learning models 202, corresponding state 204, and a listing of prediction categories 106 on which the prediction engine 108 has assigned itself as an expert. According to some embodiments, the learning models 202 can represent algorithms that are configured to analyze information (e.g., state 204) and generate predictions that can enhance a user's overall experience when operating the mobile computing device 100. According to some embodiments, the state 204 can be gathered from various sources within the mobile computing device 100, e.g., feedback information 116 provided by software applications, information gathered by sensors of the mobile computing device 100 (e.g., Global Positioning System (GPS) sensors, microphone sensors, temperature sensors, accelerometer sensors, and so on), information provided by outside sources (e.g., software applications executing on the mobile computing device 100, such as user applications, OS kernels, daemons, etc.), and the like.

As also shown in FIG. 2, the manager 104 can be configured to manage various loggers 105, various prediction categories 106, various prediction engines 108, and various filters 110. As previously set forth above, these entities can be implemented using a variety of architectural approaches, e.g., the entities can be standalone executables that are external to the prediction center 102 and communicate with the manager 104 via API commands, the entities can be bundles that are stored within a file system of the mobile computing device 100 and that are interpretable/implemented by the manager 104, and the like. As also shown in FIG. 2, the manager 104 can implement an aggregator 220 that is configured to consolidate multiple predictions 114 (e.g., when produced by different prediction engines 108). Moreover, as shown in FIG. 2, the manager 104 can be configured to maintain records of the software applications 112 that interact with the prediction center 102. As described in greater detail herein, these records can function to associate prediction engines 108 with software applications 112 that register to asynchronously receive predictions from the prediction engines 108.

Additionally, and as shown in FIG. 2, the prediction center 102 can be configured to implement a cache 206 that enables the prediction center 102/prediction engines 108 to cache generated predictions 114 in attempt to increase processing and energy consumption efficiency at the mobile computing device 100. As shown in FIG. 2, the cache 206 can include entries 208, where each entry 208 includes a prediction 114 as well as expiration information 210 that indicates how long the prediction 114 is considered to be valid. The expiration information 210 can include, for example, time-based expirations, event-based expirations, and the like. In this manner, when a prediction engine 108 frequently receives requests for a prediction 114 for a particular prediction category 106, the prediction engine 108 can generate and cache the prediction 114 in order to substantially reduce the amount of processing that would otherwise occur at the mobile computing device 100, thereby enhancing performance.

Additionally, the manager 104 implement one or more learning algorithms so that the manager 104 becomes capable of properly "warming" one or more prediction engines 108 in response to particular triggers or events occurring within the mobile computing device 100. For example, the manager 104 can identify that a particular software application 112, subsequent to being activated within the mobile computing device 100, typically issues a request for a prediction 114 (e.g., one minute after activation) for a particular category 106. In response, the manager 104 can be configured to identify the activation of the particular software application 112, and, in turn, notify the one or more prediction engines 108 that are assigned as experts on the particular category 106. In turn, each prediction of the one or more prediction engines 108 can perform an initialization/analysis to any degree that enables the prediction engine 108 to more efficiently provide its corresponding prediction 114 at the time the particular software application 112 actually issues the anticipated request for the prediction 114 for the particular category 106.

Figure 3A:
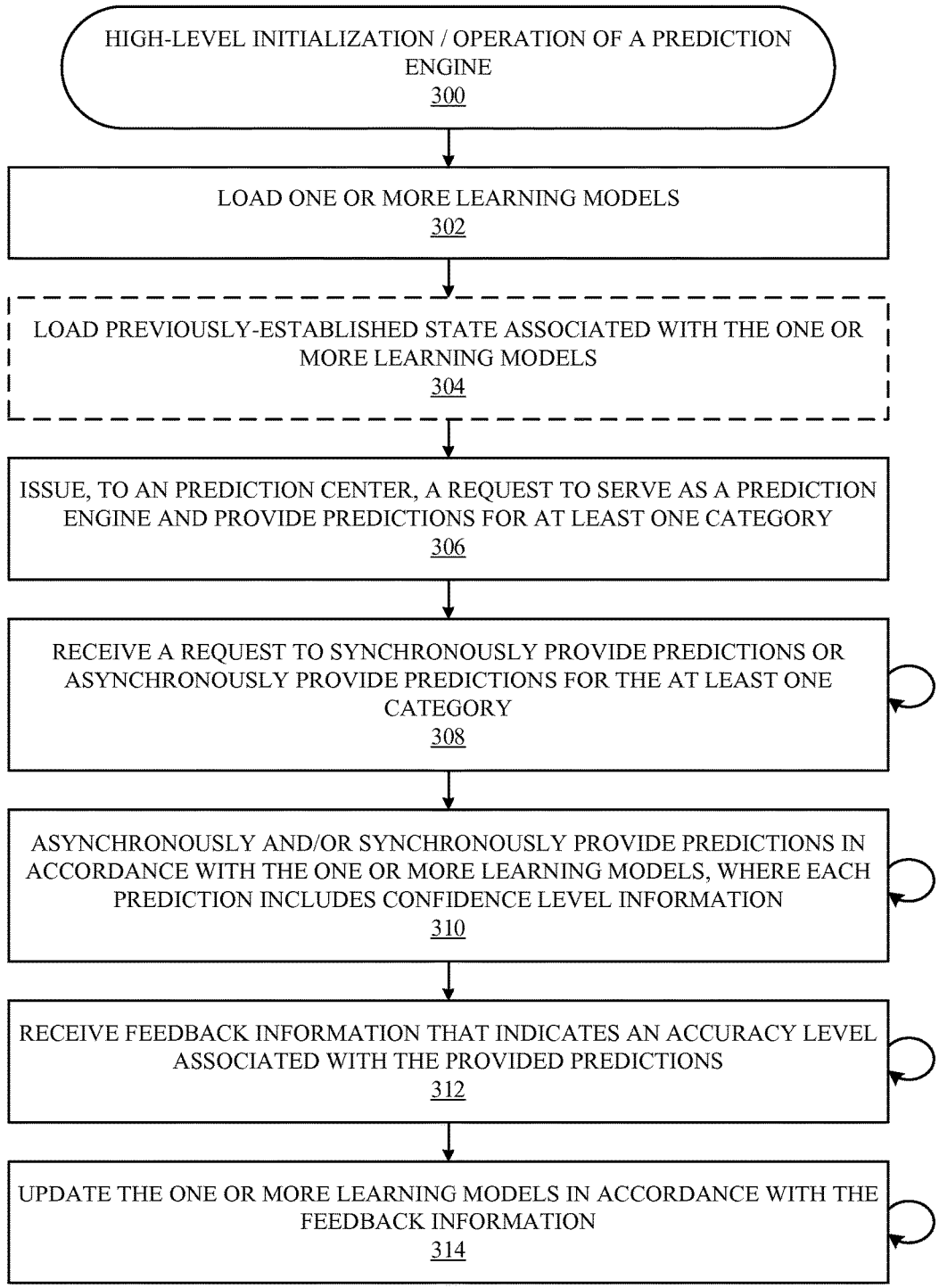
FIG. 3A illustrates a method for a high-level initialization and operation of a prediction engine, according to some embodiments.

FIG. 3A illustrates a method 300 for a high-level initialization and operation of a prediction engine 108, according to some embodiments. As shown in FIG. 3A, the method 300 begins at step 302, where the prediction engine 108 loads one or more learning models 202. At optional step 304, the prediction engine 108 loads previously-established state 204 associated with the one or more learning models 202. According to some embodiments, the previously-established state 204 can be retrieved from any storage resource that is available to the prediction engine 108, e.g., local non-volatile memory, cloud storage, and the like. At step 306, the prediction engine 108 issues, to the prediction center 102, a request to serve as an expert on (and provide predictions 114 for) at least one prediction category 106. At step 308, the prediction engine 108 receives a request to synchronously provide predictions 114 or asynchronously provide predictions 114 for the at least one prediction category 106. At step 310, the prediction engine 108 asynchronously and/or synchronously provides predictions in accordance with the one or more learning models 202, where each prediction 114 includes confidence level information. At step 312, the prediction engine 108 receives feedback information that indicates an accuracy level associated with the provided predictions 114. Such feedback information 116 can be used to "train" the learning models 202 and improve the overall accuracy of their predictions 114. For example, when the prediction engine 108 generates a prediction 114 that a particular action will be taken by a user of the mobile computing device 100, and a software application 112 provides feedback that indicates the prediction 114 held true (i.e., the particular action was taken by the user), the prediction engine 108 can increase the confidence level that is advertised when similar and subsequent predictions 114 are produced by the prediction engine 108. At step 314, the prediction engine 108 updates the one or more learning models 202 in accordance with the feedback information.

Figure 3B:
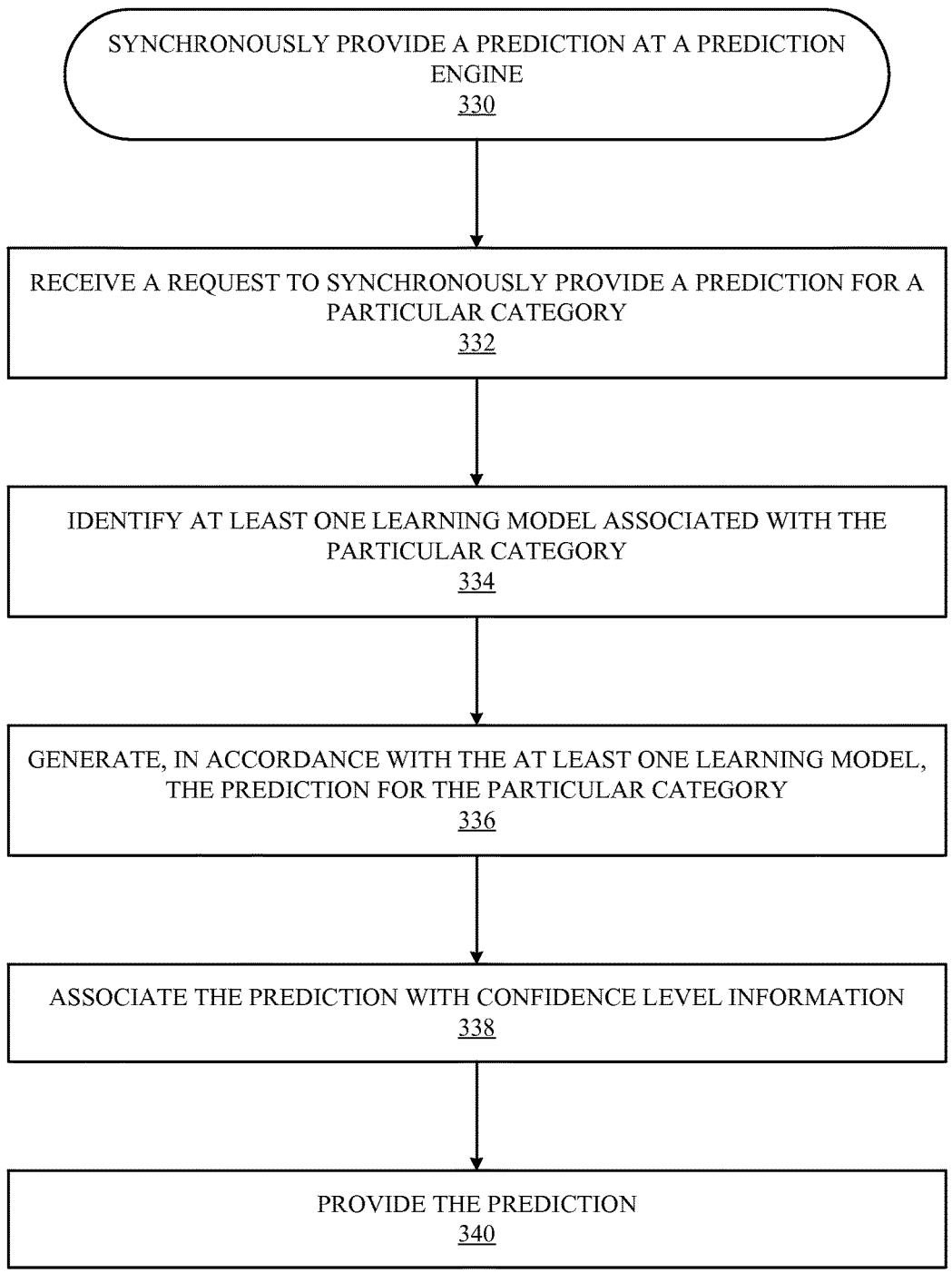
FIG. 3B illustrates a method for synchronously providing a prediction at a prediction engine, according to some embodiments.

FIG. 3B illustrates a method 330 for synchronously providing a prediction 114 at a prediction engine 108, according to some embodiments. As shown in FIG. 3B, the method 330 begins at step 332, where the prediction engine 108 receives a request to synchronously provide a prediction 114 for a particular prediction category 106. According to some embodiments, the request can be generated by the prediction center 102 on behalf of a software application 112 that is requesting the prediction 114 for the particular prediction category 106. Alternatively, the request can be generated by the software application 112 and provided directly to prediction engine 108. In this manner, the overall involvement of the prediction center 102 can be reduced or even eliminated with respect to the prediction center 102 serving as a mediator between the prediction engine 108 and the software application 112. At step 334, the prediction engine 108 identifies at least one learning model 202 that is associated with the particular prediction category 106. At step 336, the prediction engine 108 generates, in accordance with the at least one learning model 202, the prediction 114 for the particular prediction category 106. At step 338, the prediction engine 108 associates the prediction 114 with confidence level information. According to some embodiments, the confidence level information can be established by the prediction engine 108 in accordance with one or more learning models 202 that are employed by the prediction engine. For example, when the one or more learning models 202 determine that the state 204 indicates there is a high level of certainty that a particular prediction 114 will align with a user's response, the prediction engine 108 can assign a corresponding high level of confidence. Alternatively, when the state 204 is not well-defined or when little state 204 is available for processing, the one or more learning models 202 can assign a corresponding low level of confidence to indicate that the user's response may not align well with the prediction 114. At step 340, the prediction engine 108 provides the prediction 114. More specifically, and depending on the configuration (e.g., as described above in conjunction with step 332), the prediction engine 108 can provide the prediction 114 to the prediction center 102 or directly to the software application 112. In turn, the prediction 114 is aggregated (e.g., by the aggregator 220 when the prediction 114 is provided to the prediction center 102) with other predictions 114 (if any) when other prediction engines 108 provide similar predictions 114.

Figure 3C:
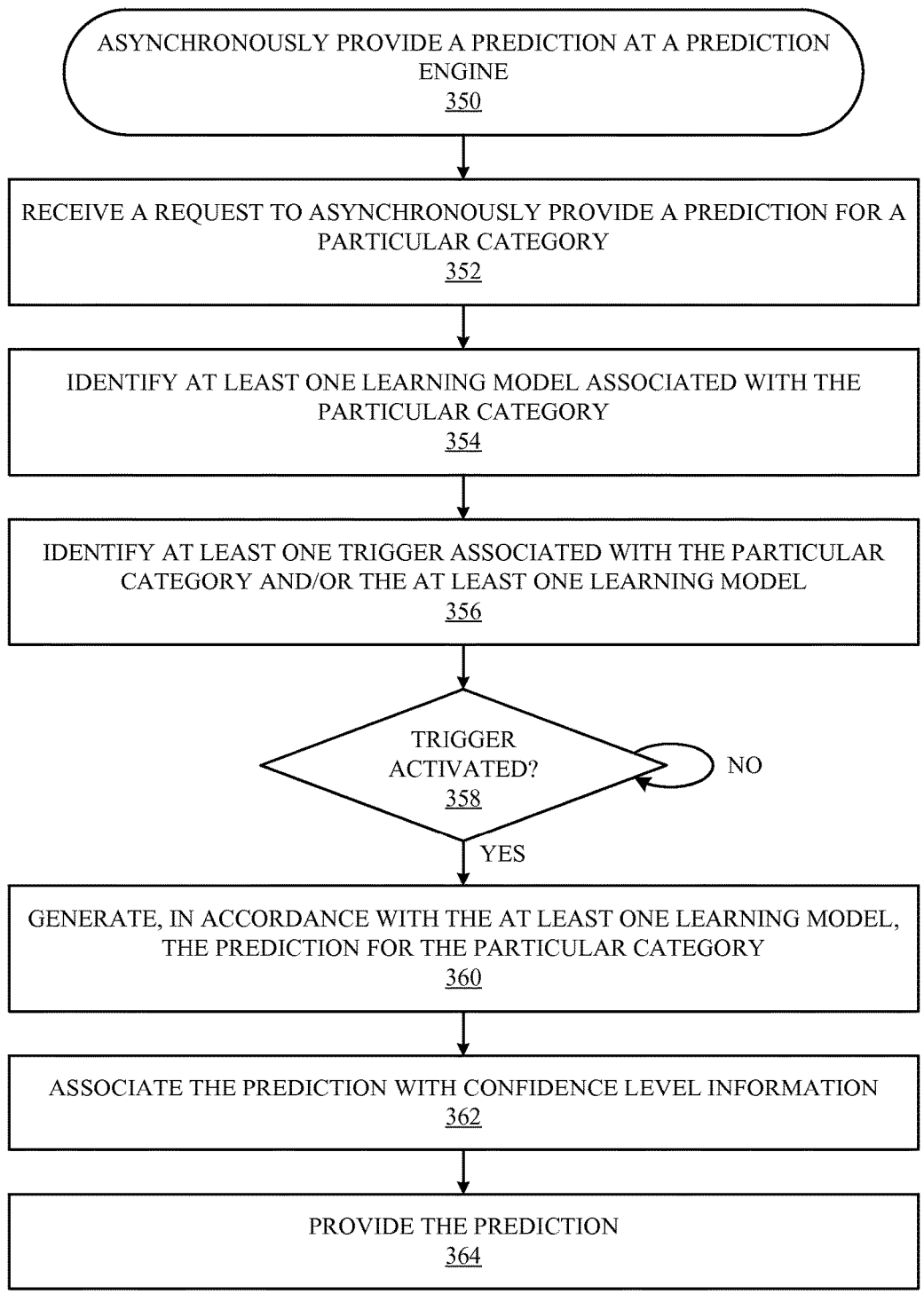
FIG. 3C illustrates a method for asynchronously providing a prediction at a prediction engine, according to some embodiments.

FIG. 3C illustrates a method 350 for asynchronously providing a prediction 114 at a prediction engine 108, according to some embodiments. As shown in FIG. 3C, the method 350 begins at step 352, where the prediction engine 108 receives a request to asynchronously provide a prediction 114 for a particular prediction category 106. At step 354, the prediction engine 108 identifies at least one learning model 202 associated with the particular prediction category 106. At step 356, the prediction engine 108 identifies at least one trigger associated with the particular prediction category 106 and/or the at least one learning model 202. At step 358, the prediction engine 108 determines whether the trigger is activated/occurs. If, at step 358, the prediction engine 108 determines that the trigger is activated, then the method 350 proceeds to step 360. Otherwise, the method 350 repeats at step 358 until the trigger is activated/occurs. At step 360, the prediction engine 108 generates, in accordance with the at least one learning model 202, the prediction 114 for the particular prediction category 106. At step 362, the prediction engine 108 associates the prediction 114 with confidence level information. At step 364, the prediction engine 108 provides the prediction 114 (e.g., to the prediction center 102 for aggregation).

Figure 4A:
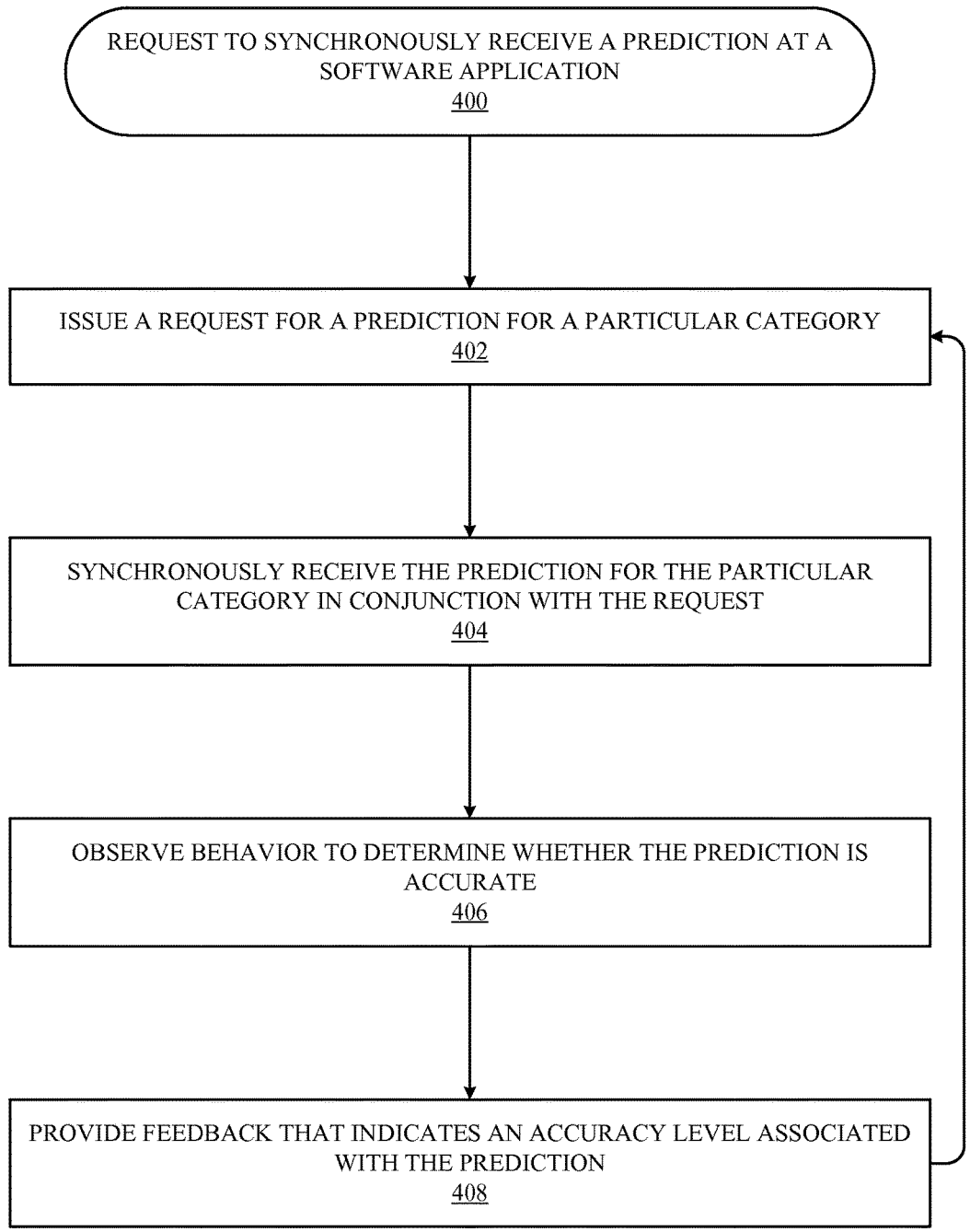
FIG. 4A illustrates a method for a software application requesting to synchronously receive a prediction, according to some embodiments.

FIG. 4A illustrates a method 400 for a software application 112 requesting to synchronously receive a prediction 114, according to some embodiments. As shown in FIG. 4A, the method 400 begins at step 402, where the software application 112 issues a request for a prediction 114 for a particular prediction category 106. According to some embodiments, the software application 112 can be configured to issue the request to the prediction center 102, where, in turn, the prediction center 102 interfaces with the prediction engines 108 that are registered as experts on the particular prediction category 106. Alternatively, the software application 112 can be configured to issue the request directly to a prediction engine 108, e.g., when the prediction engine 108 is the sole expert on the particular prediction category 106 within the mobile computing device 100. At step 404, the software application 112 synchronously receives a prediction 114 for the particular prediction category 106 in conjunction with the request issued at step 402. At step 406, the software application 112 observes behavior (e.g., user behavior) at the mobile computing device 100 to determine whether the prediction 114 is accurate. At step 408, the software application 112 provides feedback information 116 that indicates an accuracy level associated with the prediction 114.

Figure 4B:
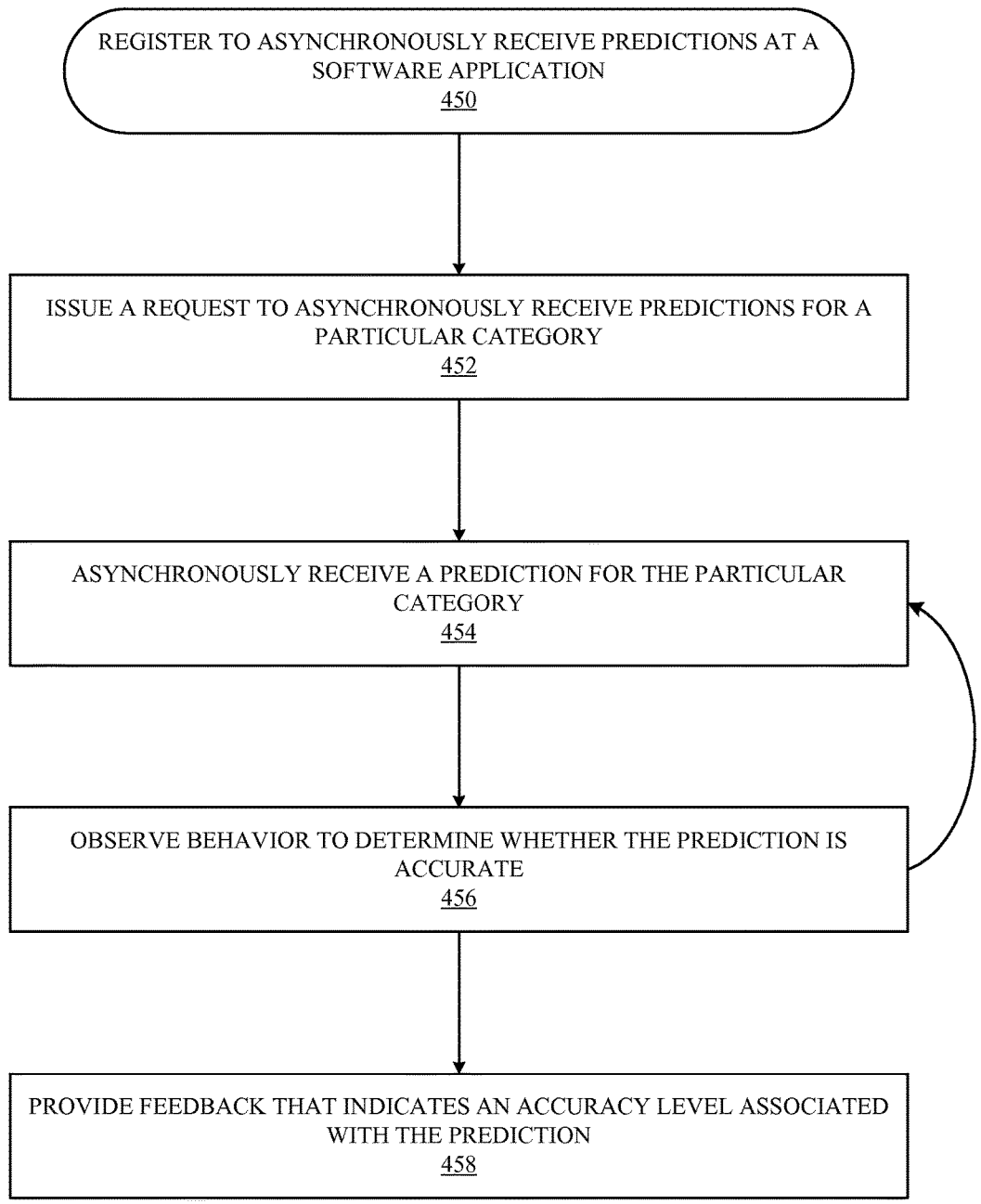
FIG. 4B illustrates a method for a software application registering to asynchronously receive predictions, according to some embodiments.

FIG. 4B illustrates a method 450 for a software application 112 registering to asynchronously receive predictions 114, according to some embodiments. As shown in FIG. 4B, the method 450 begins at step 452, where the software application 112 issues a request to asynchronously receive predictions 114 for a particular prediction category 106. At step 454, the software application 112 asynchronously receives a prediction 114 for the particular prediction category 106. At step 456, the software application 112 observes behavior (e.g., user behavior) at the mobile computing device 100 to determine whether the prediction 114 is accurate. At step 458, the software application 112 provides feedback information 116 that indicates an accuracy level associated with the prediction 114.

Figure 5A:
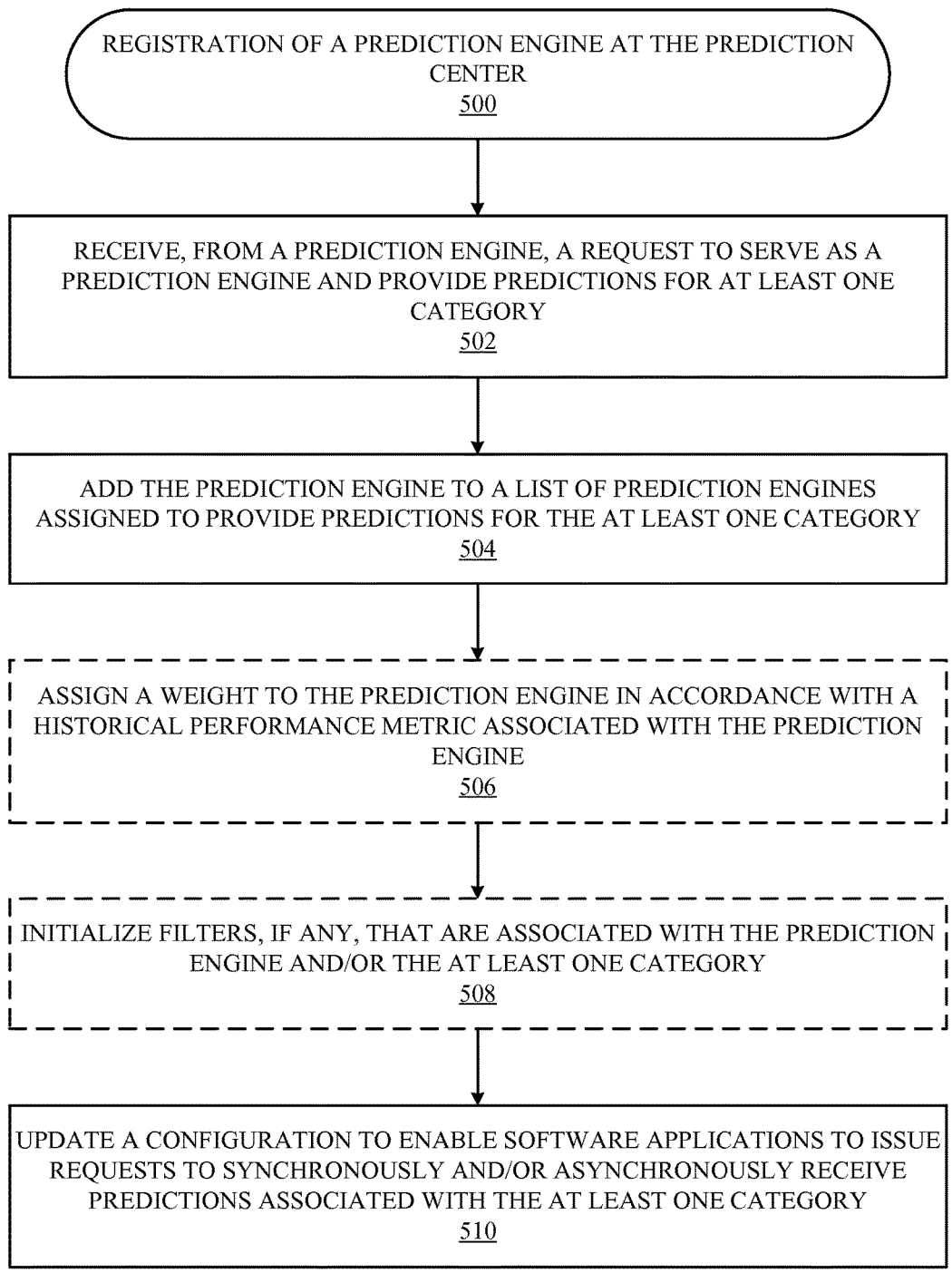
FIG. 5A illustrates a method for managing prediction engine registrations at a prediction engine center, according to some embodiments.

FIG. 5A illustrates a method 500 for managing registrations of prediction engines 108 at the prediction center 102, according to some embodiments. As shown, the method 500 begins at step 500, where the manager 104 of the prediction center 102 receives, from a prediction engine 108, a request to serve as a prediction engine 108 and provide predictions 114 for at least one prediction category 106. At step 504, the manager 104 adds the prediction engine 108 to a list of prediction engines 108 assigned to provide predictions 114 for the at least one prediction category 106. At optional step 506, the manager 104 assigns a weight to the prediction engine 108 in accordance with a historical performance metric associated with the prediction engine 108. According to some embodiments, the weight can be derived from one or more learning algorithms that are employed by the manager 104. In this manner, the weights can dynamically change over time in accordance with the overall correctness of the predictions 114 produced by the prediction engine 108—which, as previously set forth herein, can be achieved through analyzing feedback information 116. At optional step 508, the manager 104 initializes filters 110, if any, that are associated with the prediction engine 108 and/or the at least one prediction category 106. At step 510, the manager 104 updates a configuration of the prediction center 102 to enable software applications 112 to issue requests to synchronously and/or asynchronously receive predictions 114 associated with the at least one prediction category 106.

Figure 5B:
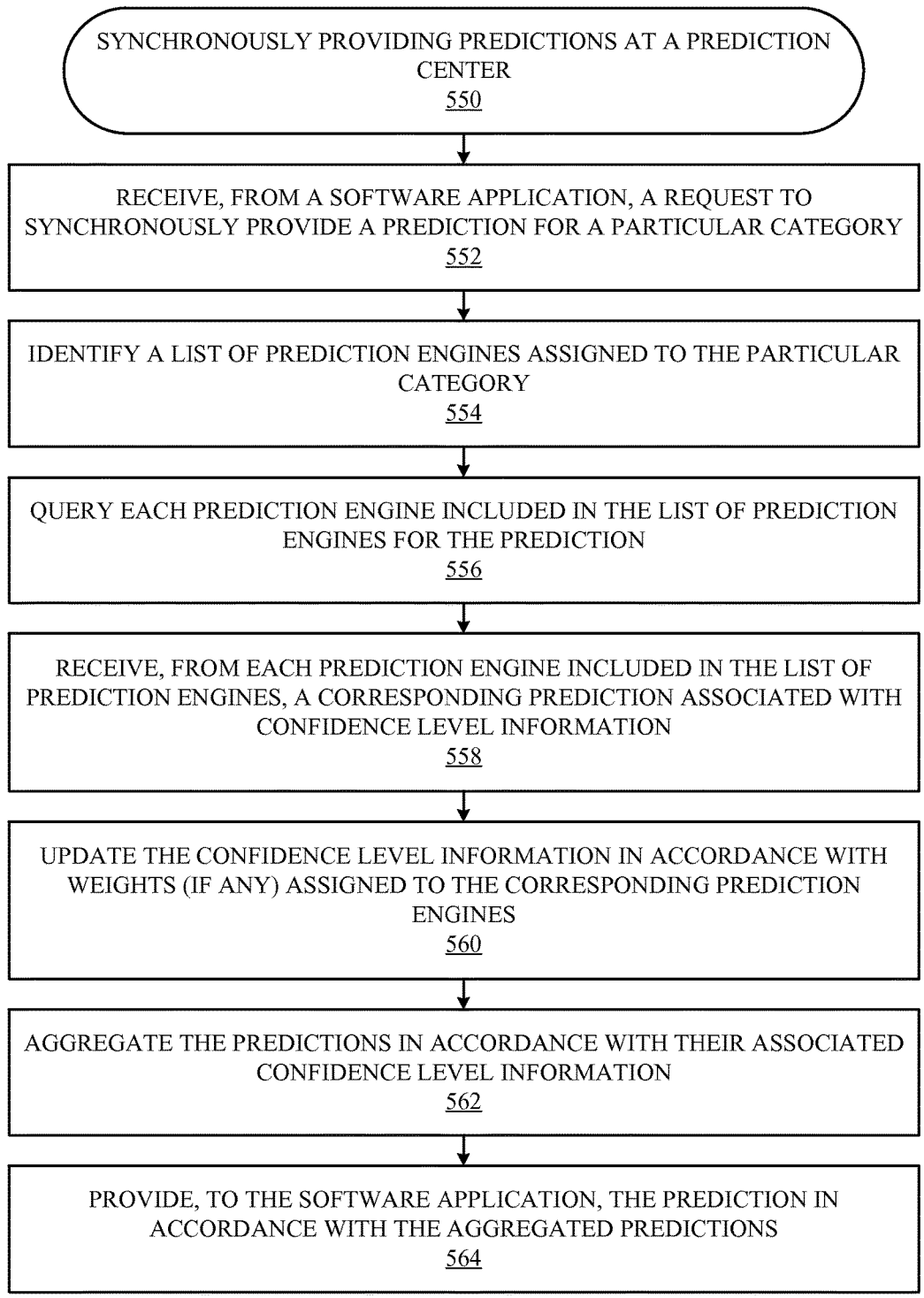
FIG. 5B illustrates a method for synchronously providing predictions to software applications at a prediction engine center, according to some embodiments.

FIG. 5B illustrates a method 550 for synchronously providing predictions 114 to software applications 112 at the prediction center 102, according to some embodiments. As shown in FIG. 5B, the method 550 begins at step 552, where the manager 104 receives, from a software application 112, a request to synchronously provide a prediction 114 for a particular prediction category 106. One example scenario can involve a messaging application activating at the mobile computing device 100 and issuing a request for a prediction 114 for three contacts that are most likely to be addressed by a user operating the messaging application. At step 554, the manager 104 identifies a list of prediction engines 108 assigned to the particular prediction category 106. Continuing with the foregoing example scenario, consider further that the two different prediction engines 108 that have registered themselves as experts on the "people" prediction category 106. At step 556, the manager 104 queries each prediction engine 108 included in the list of prediction engines 108 for the prediction 114.

At step 558, the manager 104 receives, from each prediction engine 108 included in the list of prediction engines 108, a corresponding prediction 114 associated with confidence level information. Continuing the foregoing example scenario, consider further that two prediction engines 108 provide predictions 114 that each include a separate list of three contacts that are most likely to be contacted by the user. For example, a first list can include entries that read "Greg:0.7", "Amy:0.5", and "Mom:0.3" (where the name (e.g., "Greg") represents a predicted individual who will be contacted and the number (e.g., 0.7) that follows the name represents corresponding confidence level that the predicted individual will be contacted), and a second list can include entries that read "Mom:0.7", "Greg:0.4", and "Julie:0.2". At step 560, the manager 104 updates the confidence level information associated with the predictions 114 in accordance with weights (if any) assigned to the corresponding prediction engines 108. For example, if the prediction engine 108 that produces the first list has an assigned weight of 0.75 in accordance with consistently poor performance observed by the manager 104 (e.g., via feedback information 116), the confidence level information for each entry in the first list would be reduced by 0.75. At step 562, the manager 104 aggregates (e.g., using the aggregator 220) the predictions 114 in accordance with their associated confidence level information. Continuing with the foregoing example—and, assuming that weights are not applied at step 560—step 562 would involve the manager 104 establishing the following updated list: "Greg:1.1" (i.e., 0.7+0.4=1.1), "Mom: 1.0" (i.e., 0.3+0.7=1.0), "Amy:0.5", and "Julie:0.2", where the entry for "Julie:0.2" is removed as the messaging application desires to receive a prediction for only three contacts. At step 564, the manager 104 provides, to the software application 112, the prediction 114 in accordance with the aggregated predictions 114—which would include "Greg: 1.1", "Mom:1.0", and "Amy:0.5".

Figure 5C:
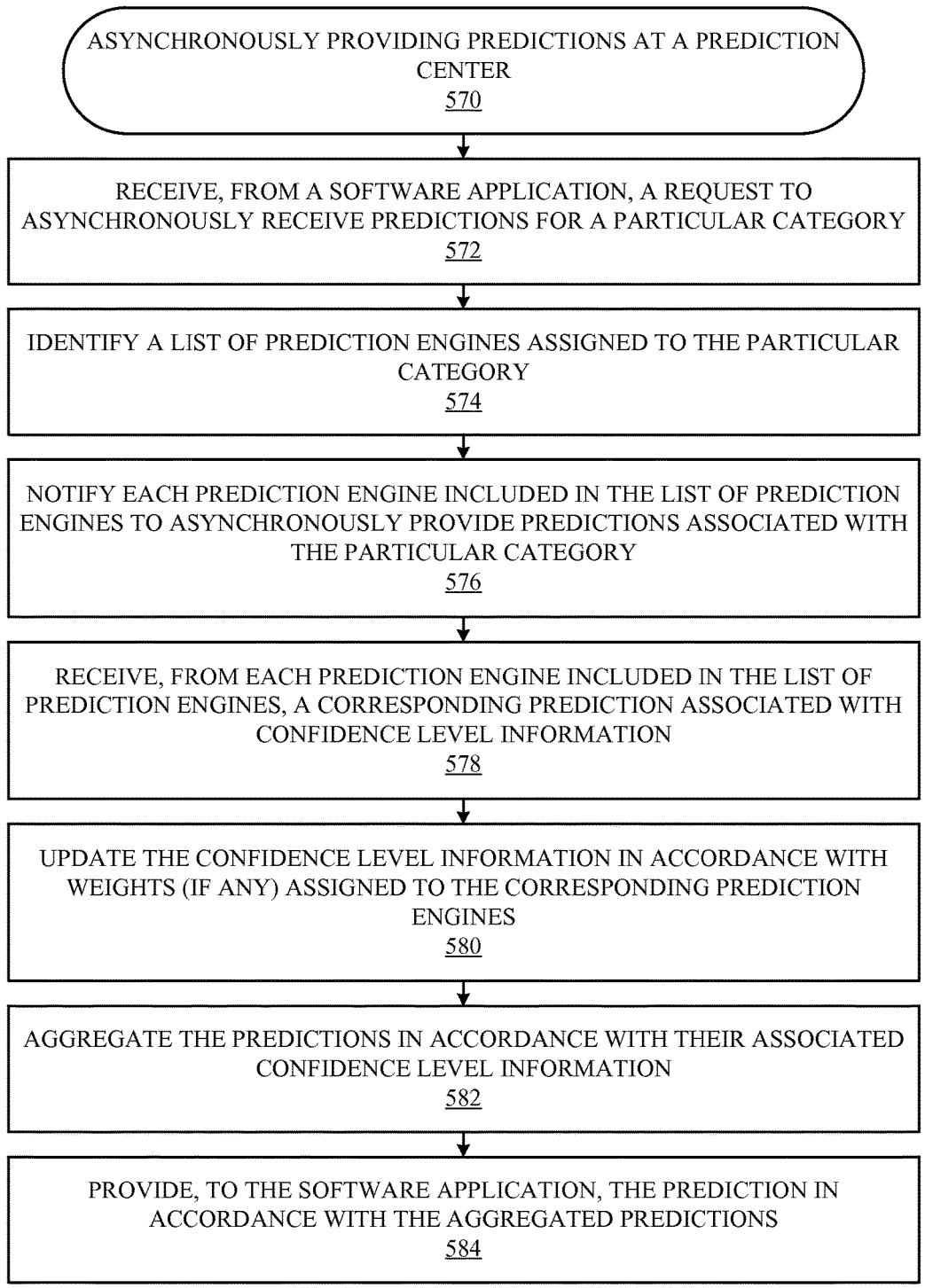
FIG. 5C illustrates a method for asynchronously providing predictions to software applications at a prediction engine center, according to some embodiments.

FIG. 5C illustrates a method 570 for asynchronously providing predictions 114 to software applications 112 at the prediction center 102, according to some embodiments. As shown, the method 570 begins at step 572, where the manager 104 receives, from a software application 112, a request to asynchronously receive predictions 114 for a particular prediction category 106. At step 574, the manager 104 identifies a list of prediction engines 108 assigned to the particular prediction category 106. At step 576, the manager 104 notifies each prediction engine 108 included in the list of prediction engines 108 to asynchronously provide predictions 114 associated with the particular prediction category 106. At step 578, the manager 104 receives, from each prediction engine 108 included in the list of prediction engines 108, a corresponding prediction 114 associated with confidence level information. At step 580, the manager 104 updates the confidence level information associated with the predictions 114 in accordance with weights (if any) assigned to the corresponding prediction engines 108. At step 582, the manager 104 aggregates the predictions 114 in accordance with their associated confidence level information. At step 584, manager 104 provides, to the software application 112, the prediction 114 in accordance with the aggregated predictions 114.

Figure 6:
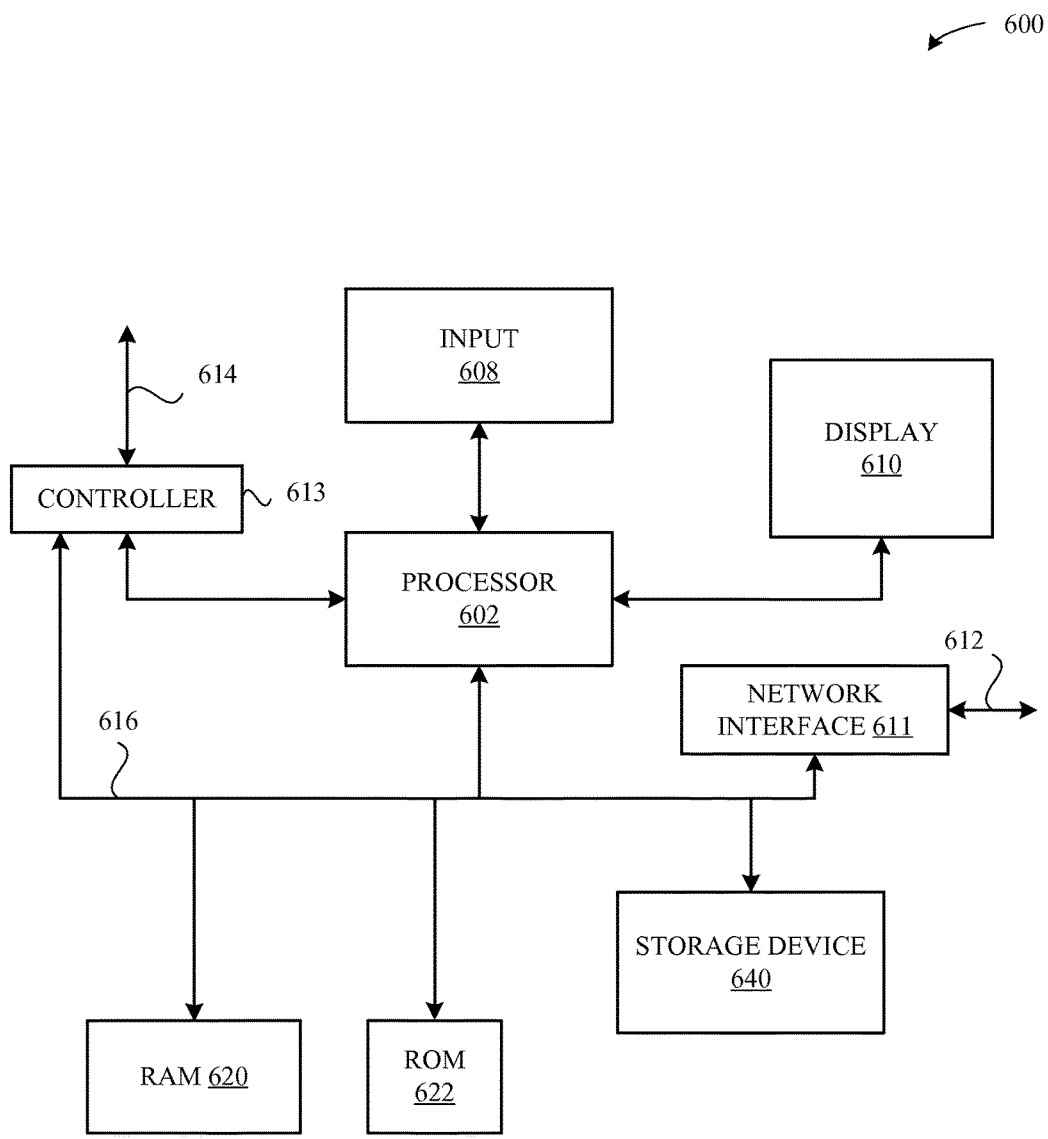
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the mobile computing device 100 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, the storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for synchronously providing predictions to software applications executing on a mobile computing device, the method comprising, at a prediction center executing on the mobile computing device:
    for each prediction engine of a plurality of prediction engines executing on the mobile computing device:
        receiving, from the prediction engine, a respective request for the prediction engine to function as an expert on at least one prediction category of a plurality of prediction categories, and
        updating a configuration of the prediction center to reflect a registration of the prediction engine as an expert on the at least one prediction category;
    receiving, from a software application, a request to synchronously provide a prediction for a prediction category of the plurality of prediction categories;
    identifying, among the plurality of prediction engines, one or more prediction engines that are registered as experts on the prediction category;
    receiving one or more predictions produced by the one or more prediction engines in accordance with the request;
    aggregating the one or more predictions to produce the prediction requested by the software application; and
    providing the prediction to the software application.

2. The method of claim 1, wherein aggregating the one or more predictions comprises carrying out one or more operations selected from:
    removing duplicate predictions from the one or more predictions;
    filtering the one or more predictions in accordance with one or more filters implemented by the prediction center;
    for each prediction of the one or more predictions:
        adjusting a confidence level associated with the prediction in accordance with a weight that is assigned to the prediction engine that produces the prediction, wherein the confidence level associated with the prediction is generated by the prediction engine when producing the prediction, and the weight is produced by one or more learning algorithms implemented by the prediction center; and
    sorting each prediction of the one or more predictions in accordance with the confidence level associated with the prediction.

3. The method of claim 2, wherein the one or more filters are associated with the one or more prediction engines and/or the prediction category.

4. The method of claim 1, further comprising, subsequent to producing the prediction requested by the software application:
    establishing validity parameters associated with the prediction;
    associating the validity parameters with the prediction;
    storing the prediction and the validity parameters into a cache.

5. The method of claim 4, wherein the validity parameters define one or more of a time-based expiration or a trigger-based expiration.

6. The method of claim 4, further comprising, subsequent to storing the prediction and the validity parameters into the cache:
    receiving, from a second software application, a second request to synchronously provide the prediction for the prediction category;
    locating the prediction within the cache; and
    when the validity parameters associated with the prediction indicate that the prediction is valid:
        providing the prediction to the second software application.

7. The method of claim 1, wherein the plurality of prediction categories are managed by the prediction center, and each prediction engine functions as an expert on a given prediction category when the given prediction category is associated with:
    activations and deactivations of software applications executing on the mobile computing device,
    contacts known to the mobile computing device,
    Global Positioning System (GPS) information available to the mobile computing device,
    notifications processed by the mobile computing device, or
    physical input made to the mobile computing device.

8. The method of claim 1, further comprising, subsequent to providing the prediction to the software application:
    receiving, from the software application, feedback information that indicates an accuracy of the prediction; and
    providing the feedback information to the one or more prediction engines of the plurality of prediction engines, wherein the feedback information can be utilized by the one or more prediction engines to increase the accuracy of subsequent predictions that are produced by the one or more prediction engines.

9. A method for asynchronously providing predictions to software applications executing on a mobile computing device, the method comprising, at a prediction center executing on the mobile computing device:
for each prediction engine of a plurality of prediction engines executing on the mobile computing device:
receiving, from the prediction engine, a respective request for the prediction engine to function as an expert on at least one prediction category of a plurality of prediction categories, and
updating a configuration of the prediction center to reflect a registration of the prediction engine as an expert on the at least one prediction category;
receiving, from a software application, a request to asynchronously provide a prediction for a prediction category of the plurality of prediction categories;
identifying, among the plurality of prediction engines, one or more prediction engines that are registered as experts on the prediction category; and
notifying each prediction engine of the one or more prediction engines to asynchronously provide one or more predictions in accordance with the request.

10. The method of claim 9, further comprising, subsequent to notifying each prediction engine of the one or more prediction engines:
receiving the one or more predictions;
aggregating the one or more predictions to produce the prediction requested by the software application; and
providing the prediction to the software application.

11. The method of claim 10, further comprising, subsequent to producing the prediction requested by the software application:
establishing validity parameters associated with the prediction;
associating the validity parameters with the prediction;
storing the prediction and the validity parameters into a cache.

12. The method of claim 11, wherein the validity parameters are provided by the one or more prediction engines and define one or more of a time-based expiration or a trigger-based expiration.

13. The method of claim 10, wherein aggregating the one or more predictions comprises carrying out one or more operations selected from:
removing duplicate predictions from the one or more predictions;
filtering the one or more predictions in accordance with one or more filters implemented by the prediction center;
for each prediction of the one or more predictions:
adjusting a confidence level associated with the prediction in accordance with a weight that is assigned to the prediction engine that produces the prediction, wherein the confidence level associated with the prediction is generated by the prediction engine when producing the prediction, and the weight is produced by one or more learning algorithms implemented by the prediction center; and
sorting each prediction of the one or more predictions in accordance with the confidence level associated with the prediction.

14. The method of claim 13, wherein the one or more filters are associated with the one or more prediction engines and/or the prediction category.

15. The method of claim 9, wherein the one or more prediction engines asynchronously provide the one or more predictions to the prediction center in response to a trigger-based event that occurs at the mobile computing device.

16. The method of claim 9, wherein the plurality of prediction categories are managed by the prediction center, and each prediction engine functions as an expert on a given prediction category when the given prediction category is associated with:
activations and deactivations of software applications executing on the mobile computing device,
contacts known to the mobile computing device,
Global Positioning System (GPS) information available to the mobile computing device,
notifications processed by the mobile computing device, or
physical input made to the mobile computing device.

17. A mobile computing device configured to generate predictions in accordance with user behavior, the mobile computing device comprising a processor that is configured to execute:
a prediction center configured serve as a mediator between one or more prediction engines and one or more software applications, wherein the prediction center manages a plurality of prediction categories;
the one or more prediction engines, wherein each prediction engine of the one or more prediction engines registers as an expert on at least one prediction category of the plurality of prediction categories managed by the prediction center, and a configuration of the prediction center is updated to reflect the registrations of the one or more prediction engines as experts; and
the one or more software applications, wherein each software application of the one or more software applications is configured to carry out steps that include:
issuing, to the prediction center, a request for a prediction for a particular prediction category of the plurality of prediction categories, and
receiving the prediction from the prediction center in accordance with the request, wherein the prediction is an aggregation of at least two predictions produced by the prediction engines that serve as experts on the particular prediction category.

18. The mobile computing device of claim 17, wherein aggregating the at least two predictions comprises carrying out one or more operations selected from:
removing duplicate predictions from the at least two predictions;
filtering the at least two predictions in accordance with one or more filters implemented by the prediction center;
for each prediction of the at least two predictions:
adjusting a confidence level associated with the prediction in accordance with a weight that is assigned to the prediction engine that produces the prediction, wherein the confidence level associated with the prediction is generated by the prediction engine when producing the prediction, and the weight is produced by one or more learning algorithms implemented by the prediction center; and
sorting each prediction of the at least two predictions in accordance with the confidence level associated with the prediction.

19. The mobile computing device of claim 17, wherein the prediction center is configured to carry out steps that include, subsequent to providing the prediction to the software application:
- receiving, from the software application, feedback information that indicates an accuracy of the prediction; and
- providing the feedback information to the prediction engines that produced the at least two predictions, wherein the feedback information can be utilized by the prediction engines to increase an accuracy of subsequent predictions that are produced by the prediction engines.

20. The mobile computing device of claim 17, wherein the plurality of prediction categories are managed by the prediction center, and each prediction engine functions as an expert on a given prediction category when the given prediction category is associated with:
- activations and deactivations of software applications executing on the mobile computing device,
- contacts known to the mobile computing device,
- Global Positioning System (GPS) information available to the mobile computing device,
- notifications processed by the mobile computing device, or
- physical input made to the mobile computing device.

* * * * *